United States Patent
Kourtakis

(10) Patent No.: US 7,345,005 B2
(45) Date of Patent: Mar. 18, 2008

(54) ELECTROCATALYSTS AND PROCESSES FOR PRODUCING

(75) Inventor: Kostantinos Kourtakis, Media, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 120 days.

(21) Appl. No.: 10/539,195

(22) PCT Filed: Feb. 10, 2004

(86) PCT No.: PCT/US2004/004165

§ 371 (c)(1),
(2), (4) Date: Jun. 17, 2005

(87) PCT Pub. No.: WO2004/073090

PCT Pub. Date: Aug. 26, 2004

(65) Prior Publication Data

US 2006/0073966 A1    Apr. 6, 2006

(51) Int. Cl.
*B01J 21/18* (2006.01)
*B01J 23/40* (2006.01)
*B01J 23/74* (2006.01)
*B01J 23/60* (2006.01)
*H01M 4/88* (2006.01)
*H01M 8/00* (2006.01)
*H01M 2/00* (2006.01)
*H01M 2/02* (2006.01)
*H01M 2/14* (2006.01)
*H01M 4/00* (2006.01)

(52) U.S. Cl. .................. 502/182; 502/101; 502/185; 502/325; 502/339; 429/30; 429/33; 429/34; 429/38; 429/39; 429/40; 429/41; 429/42; 429/43; 429/44

(58) Field of Classification Search .......... 502/101, 502/185, 325, 339, 182; 429/30, 33, 34, 429/38–44
See application file for complete search history.

(56) References Cited

U.S. PATENT DOCUMENTS

| | | | |
|---|---|---|---|
| 3,282,875 A | | 11/1966 | Connolly et al. |
| 4,111,842 A | * | 9/1978 | van Montfoort et al. ... 502/183 |
| 4,358,545 A | | 11/1982 | Ezzell et al. |
| 4,940,525 A | | 7/1990 | Ezzell et al. |
| 5,061,671 A | | 10/1991 | Kitson et al. |
| 5,484,666 A | | 1/1996 | Gibb et al. |
| 5,525,436 A | | 6/1996 | Savinell et al. |
| 5,547,551 A | | 8/1996 | Bahar et al. |
| 5,716,727 A | | 2/1998 | Savinell et al. |
| 5,725,781 A | * | 3/1998 | Bousquet et al. ........... 210/757 |
| 6,025,085 A | | 2/2000 | Savinell et al. |
| 6,066,410 A | * | 5/2000 | Auer et al. .................... 429/40 |
| 6,099,988 A | | 8/2000 | Savinell et al. |
| 6,110,333 A | | 8/2000 | Spethmann et al. |
| 6,603,039 B1 | * | 8/2003 | Ebner et al. .................. 562/17 |
| 6,670,301 B2 | | 12/2003 | Adzic et al. |
| 2004/0067847 A1 | * | 4/2004 | Kato ........................... 502/325 |
| 2006/0144791 A1 | * | 7/2006 | Debe et al. ................. 210/651 |
| 2006/0286435 A1 | * | 12/2006 | Kourtakis ..................... 429/44 |

OTHER PUBLICATIONS

Watanabe et. al., Preparation of Highly Dispersed Pt + Ru Alloy Clusters and the Activity for the Electrooxidation of Methanol., J. Electroanal. Chem., 1987, vol. 229:395-406.
Gasteiger et. al., Co Electrooxidation on Well-Characterized Pt-Ru Alloys, J. Phys. Chem., 1994, vol. 98:617-625.
W. Hunter et. al., An Introduction to Design, Data Analysis and Model Building, Statistics for Experimenters, 1978, John Wiley & Sons (Book Not Included).

* cited by examiner

*Primary Examiner*—J. A. Lorengo
*Assistant Examiner*—Patricia L. Hailey

(57) ABSTRACT

Noble metal catalysts and methods for producing the catalysts are provided. The catalysts are useful in applications such as fuel cells. The catalysts exhibit reduced agglomeration of catalyst particles as compared to conventional noble metal catalysts.

25 Claims, No Drawings

ELECTROCATALYSTS AND PROCESSES FOR PRODUCING

FIELD OF THE INVENTION

The present invention relates to noble metal catalysts and processes for making the catalysts. In particular, the invention relates to platinum-based noble metal catalysts. The catalysts are useful as anode or cathode electro catalysts. The electro catalysts are useful in fuel cells. The processes for making the electro catalysts rely in part on colloid chemistry.

BACKGROUND

Noble metal electro catalysts containing platinum are widely used in fuel cell applications. Binary catalysts, e.g., of ruthenium and platinum, have been reported to have synergistic effects in some reactions. For example, a specific activity a factor of 10 higher than for pure platinum has been reported for a platinum-ruthenium catalyst. Watanabe et al., "Preparation of Highly Dispersed Pt+Ru Alloy Clusters and the Activity for the Electrooxidation of Methanol", *J. Electroanal. Chem.*, 229, 395-406 (1987). Watanabe et al., disclose a method for producing a platinum/ruthenium catalyst. The method produces clusters in a colloidal dispersion, with a catalyst concentration of approximately 0.7 grams of colloid metal (platinum, or platinum and ruthenium) per liter of solution. Other processes for the production of noble metal catalysts include the use of acid treated carbon supports. Such catalysts are useful in electrochemical cells. Electrochemical cells generally include an anode electrode and a cathode electrode separated by an electrolyte. A well-known use of electrochemical cells is in a stack for a fuel cell (a cell that converts fuel and oxidants to electrical energy) that uses a proton exchange membrane (hereafter "PEM") as the electrolyte. In such a cell, a reactant or reducing fluid such as hydrogen is supplied to the anode electrode and an oxidant such as oxygen or air is supplied to the cathode electrode. The hydrogen electrochemically reacts at a surface of the anode electrode to produce hydrogen ions and electrons. The electrons are conducted to an external load circuit and then returned to the cathode electrode, while hydrogen ions transfer through the electrolyte to the cathode electrode, where they react with the oxidant and electrons to produce water and release thermal energy.

Most efficient fuel cells use pure hydrogen as the fuel and oxygen as the oxidant. The use of pure hydrogen has known disadvantages, including relatively high cost and storage considerations. Consequently, attempts have been made to operate fuel cells using other than pure hydrogen as the fuel.

In an organic/air fuel cell, an organic fuel such as methanol, formaldehyde, or formic acid is oxidized to carbon dioxide at an anode, while air or oxygen is reduced to water at a cathode. Fuel cells employing organic fuels are extremely attractive for both stationary and portable applications, in part, because of the high specific energy of the organic fuels, e.g., the specific energy of methanol is 6232-watt hours per kilogram (Wh/kg). One such fuel cell is a "direct oxidation" fuel cell in which the organic fuel is directly fed into the anode, where the fuel is oxidized. Thus, the need for a reformer to convert the organic fuel into a hydrogen rich fuel gas is avoided resulting in considerable weight and volume savings for the fuel cell system. A direct methanol fuel cell is one such fuel cell system.

Materials customarily used as anode electro catalysts are pure metals or simple alloys (e.g., Pt, Pt/Ru, Pt~i) supported on high surface area carbon. For example, the state-of-the-art anode catalysts for hydrocarbon (e.g., direct methanol) fuel cells are based on platinum (Pt)-ruthenium (Ru) alloys. Heretofore, the best known catalyst was $Pt_{50}/Ru_{50}$ (numbers in subscript indicate atomic ratios). Gasteiger et al., *J. Phys. Chem.*, 98:617, 1994; Watanabe et al., *J. Electroanal. Chem.*, 229-395, 1987.

Some known processes for making noble metal catalysts produce noble metal catalyst particles that are highly agglomerated on the support, especially for carbon-supported catalysts having a high metal to carbon ratio.

A need remains for improved catalysts. It is desirable to maximize the concentration of catalyst and, for supported catalysts, to minimize agglomeration of the metal particles on the support in order to maximize the metal surface area and improve the reactivity of the catalyst produced.

SUMMARY OF THE INVENTION

One aspect of the present invention is a process for preparing a noble metal catalyst. The process includes providing a solution of a platinum reagent containing platinum having a valency less than (IV); adding an oxidizing agent to the platinum reagent; providing treated particulate carbon; introducing the particulate carbon into the platinum reagent solution; and contacting the platinum solution containing the particulate carbon with a precipitating agent.

In some embodiments, prior to providing said treated particulate carbon, the process includes providing solution of a ruthenium reagent containing ruthenium having a valency less than (IV, also represented as 4+) and adding the ruthenium reagent solution to the platinum reagent solution.

In some embodiments, the platinum reagent is formed by providing an aqueous chloroplatinic acid solution and adding sodium hydrogen sulfite to the aqueous chloroplatinic acid solution to form platinum sulfite acid.

Another aspect of the invention is a noble metal catalyst comprising a particulate carbon support and particulate platinum having a valency less than (IV). The catalyst has a total agglomerate volume less than about $2.4 \times 10^{11}$ $nm^3/nm^2$. In preferred embodiments, the particulate carbon support is chemically treated. The treatment preferably includes contacting said carbon with an agent selected from the group consisting of oxygen gas, hydrogen peroxide, organic peroxides, and ozone.

DETAILED DESCRIPTION

The present invention provides supported noble metal catalysts and processes for preparing them. The processes utilize colloidal chemistry and include the use of a surfactant or dispersant and a treated-carbon support. Treatment of the carbon can be accomplished, for example, with oxidizing acids. Alternatively, the carbon can be treated with agents such as mild oxidants, which can functionalize the carbon and acidify the carbon surface.

It has been surprisingly found that controlling the rate of addition of certain components used in making the catalysts to other components improves the quality of the catalysts produced according to the processes disclosed herein. It has also been surprisingly found that functionalization of the particulate carbon support used in the processes, when combined with control of the rate of addition of components to each other, provides unexpected improvement in the properties of the catalyst produced, in the presence of a surfactant or dispersant, including minimization or elimination of metal particle agglomeration on the catalyst support.

Moreover, in the presence of a dispersant or surfactant the improvement in properties was unexpectedly greater than the improvement observed due to each of the two variables, namely functionalization and controlled rate of addition, independently. While it is not intended that the present invention be bound by any particular theory, it is believed that an interaction between the ruthenium chloride or the product of reaction between a soluble ruthenium precursor having a valency less than IV, such as $RuCl_3$ and a liquid oxidizing agent such as hydrogen peroxide which are both utilized in producing the catalyst, and the treated particulate carbon in the presence of a surfactant or dispersant, which interaction is dependent in part upon the rate at which the ruthenium and the platinum are brought together, provides in part the unexpected results observed.

The processes disclosed herein provide a higher concentration of catalyst in the liquid volumes present during the catalyst preparation than conventional processes, and better dispersion and non-agglomeration of metal or colloidal oxide particles on the catalyst support. Agglomeration of noble metal particles on catalyst supports is a known problem with relatively high metal-to-carbon ratio catalyst compositions. With higher metal to carbon ratio compositions, or metal rich compositions, crowding of the support surface by the metal or metal oxide particles leads to crowding of the surface and agglomeration of the metal or metal oxide particles on the surface structure. The agglomeration referred to herein is a secondary structure, which means agglomeration of smaller noble metal particles that are present on the catalyst support. The processes disclosed herein also provide catalysts having reduced particle agglomeration in comparison with other processes such as processes for lower metal to carbon ratio catalyst compositions and synthetic processes in which relatively higher dilutions of liquid components are used during the synthesis of the catalysts such as disclosed by Watanabe et al. For example, when the total amount of metal (e.g., platinum and ruthenium in a Pt/Ru binary system) present in the catalyst produced is greater than that of carbon, i.e., the metal to carbon weight ratio is greater than 50 weight percent metal, agglomeration of the noble metal particles on the crowded carbon support can occur.

A reduction in the number and size of agglomerated metal or agglomerated colloidal metal oxide particles, or colloidal metal/colloidal oxide mixtures, as provided by the processes disclosed herein, can be counted and measured by transmission electron microscopy (TEM). Lower synthesis volumes can also be used for the preparation of the catalysts. A typical volumetric productivity for the processes disclosed herein is about 2.26-g catalyst/liter reaction volume. The apparent volumetric productivity for the process disclosed by Watanabe is <1 g catalyst/liter reaction volume.

Catalysts made according to the processes disclosed herein are useful in fuel cells and, in particular, as supported catalysts for fuel cells, for example, as anode or cathode catalysts for direct methanol fuel cells. The catalysts are useful in any oxidation or reduction reaction in a fuel cell. Moreover, the catalysts are useful in any application wherein noble metal catalysts are used.

The catalysts have increased oxygen content in the support as compared to conventional binary metal catalysts. Preferably, the oxygen content of the carbon support contained in the catalyst is from about 0.1 to about 5 weight percent of the carbon support, preferably from about 3 to 4 weight percent of the carbon support, more preferably from about 2.45 to about 2.65 weight percent.

Typical carbon supports (prior to treatment) are turbostratic or graphitic carbons of varying surface areas such as Cabot Corporation's Vulcan® XC72R, Akzo Noble Ketjen® 600 or 300, Vulcan® Black Pearls (Cabot Corporation), acetylene black (Denki Kagku Kogyo Kabushiki Kaisha), as well as other conducting carbon varieties. Other carbons include acetylene black and other graphite powders, single or multiwalled carbon nanotubes, fibers or other carbon structures (fullerenes, nanohorns).

The catalysts also have a microstructure that differs from that of conventional noble metal catalysts. It is believed that the interaction between the treated carbon support and the metals in the catalysts results in a highly dispersed catalyst with minimal metal agglomeration on the support. Agglomeration can be a problem in high metal:carbon ratio compositions.

To produce a catalyst, an aqueous platinum mixture is provided. The aqueous platinum mixture contains a soluble platinum precursor that either is in a lower valence state (below Pt 4+) or can be reduced to a lower valence state. The platinum in the aqueous platinum mixture is preferably provided in its +2 oxidation state for use in making the catalyst. For example, chloroplatinic acid, $H_2PtCl_6$ can be reduced with $NaHSO_3$ to form $H_3Pt(SO_3)_2OH$, platinum sulfite acid, a Pt(II) reagent, in situ. Chloroplatinic acid contains Pt in a +4 oxidation state, i.e., Pt(IV). Alternatively, $H_3Pt(SO_3)_2OH$, or other soluble platinum +2 (Pt(II)) salts such as ammonium tetrachloroplatinate (II), potassium tetrachloroplatinate (II), water soluble platinum (II) phosphine complexes (e.g. chlorotris(2,3,5-triaza-7-phosphoadamantane)platinum (II) chloride, $(TPA)_3PtCl_2$) or other lower valent water soluble platinum salts, can be used directly. However, the use of chloroplatinic acid, followed by reaction with $NaHSO_3$, or of $H_3Pt(SO_3)_2OH$ directly is preferred.

Thus, in preferred embodiments, the processes disclosed herein utilize an aqueous chloroplatinic acid solution. The concentration of the chloroplatinic acid solution is not critical. However, the concentration of chloroplatinic acid can generally vary between about 1 and about 20 weight percent platinum, with about 5 to about 15 weight percent platinum being advantageously used.

A reagent solution containing ruthenium, such as ruthenium chloride solution, is combined with the aqueous platinum mixture in the presence of the oxidant, preferably hydrogen peroxide to form a catalyst mixture. Ruthenium chloride solutions can be prepared by methods known to those skilled in the art. Although the concentration of ruthenium chloride in the solution is not critical, from about 1 weight percent to about 10 weight percent can be advantageously used, and about 2 weight percent is preferred. The ruthenium chloride solution is preferably added to the aqueous platinum mixture. Also preferably, the ruthenium chloride solution is added at a rate greater than 0.3 mmoles Ru/minute, preferably from about 0.7 to about 4.0 mmoles ruthenium/minute, most preferably, from about 0.9 to about 3.6 mmoles Ru/minute. Other soluble ruthenium precursors can also be used, such as ruthenium (III) nitrosylnitrate, ruthenium (III) nitrosylsulfate, and other water soluble ruthenium reagents with a ruthenium valence less the (IV). Ruthenium chloride is preferred.

Following the generation of, or with the direct use of, a Pt(II) reagent, and the formation of the catalyst mixture, an oxidizer, such as hydrogen peroxide, is added to the catalyst mixture. Other suitable oxidizing agents include water-soluble agents (e.g., hypochlorous acid) or gas phase oxidizing agents such as ozone. Gas phase oxidizing agents can be introduced by bubbling into the liquid media. The oxidizing agent is added to convert the Pt(II) reagent to colloidal $PtO_2$, in which platinum is Pt(IV). The introduction of the oxidizing agent forms a colloid mixture, in which the platinum is present in colloidal form. When ruthenium chloride is present in the catalyst mixture, and excess oxidizing agent, e.g., excess hydrogen peroxide, is present, the oxidizing agent can react with the ruthenium chloride to form ruthenium oxide, which is also present as a colloid.

The amount of hydrogen peroxide used in the reaction can be from about 15:1 to 700:1, based on the mole ratio of $H_2O_2$ to total moles of metal, preferably 100:1 to 300:1 and more preferably about 211:1.

Alternatively, instead of adding all of the hydrogen peroxide after the addition of the platinum solutions, a portion of the hydrogen peroxide can be added simultaneously with the ruthenium chloride.

A surfactant or dispersant can be added to the chloroplatinic acid solution, following the addition of $NaHSO_3$ to generate $H_3Pt(SO_3)_2OH$). Alternatively, if the Pt(II) reagent is incorporated directly rather than generated in situ, a surfactant or dispersant can be added directly thereto. However, a surfactant or dispersant can also be directly added after the addition of the ruthenium chloride, which may be desirable when foaming or reaction of the surfactant with hydrogen peroxide is likely. As yet another alternative, the surfactant or dispersant can be added to the carbon support, which is then added to the colloid mixture. In one preferred embodiment, the surfactant is added to the colloid mixture following the $RuCl_3$ addition, optionally dispersing the carbon support and adding the surfactant carbon support slurry to the reaction mixture.

Surfactants and dispersants are known to those skilled in the art. As used herein, dispersants are a class of materials that are capable of bringing fine solid particles into a state of suspension so as to inhibit or prevent their agglomeration or settling in a fluid medium. The term surfactant, or surface active agent, is used herein to describe substances with certain characteristic features in structure and properties, such as amphipathic structure (having groups with opposing solubility tendencies); solubility in liquid media; formation of micelles at certain concentrations; formation of orientated monolayers at phase interfaces surfactant molecules and ions form oriented monolayers at phase interfaces (in this case, liquid-solid interface); and adsorption at interfaces. Thus, although a surfactant can operate to disperse particles, a dispersant need not have the properties of a surfactant and can operate by different mechanisms than would a surfactant. Accordingly, the terms are not used interchangeably herein. Surfactants and dispersants suitable for use in the processes for making the catalysts can be anionic surfactants containing carboxylate, sulfonate, sulfate or phosphate groups; nonionic surfactants such as those derived from ethoxylates, carboxylic acid esters, carboxylic amines, and polyalkylene oxide block copolymers.

In some embodiments, when surfactants are used, nonionic surfactants are preferred. In some embodiments, when dispersants are used, anionic dispersants are preferred. An exemplary anionic surfactant is Tergitol® 15-S40 (25% aqueous), which is an alkyl alcohol ethoxylate. Exemplary non-ionic dispersants are Daxad® dispersing agents, which are available from Hampshire Chemical Corporation, Houston, Tex. Daxad® dispersing agents include a variety of high and low molecular weight condensed naphthalene sulfonates.

In some embodiments, the surfactant or dispersant is provided in the form of a suspension. The suspension contains sufficient surfactant or dispersant to stabilize the colloid and/or the carbon support. Preferably, the suspension contains from about 0.0001 weight percent to about 20 weight percent of surfactant or dispersant based on the total combined weight of solids. Total combined weight of solids means the total weight of surfactant/dispersant, platinum, and particulate carbon. Particulate carbon is discussed herein below. More preferably, the suspension contains from about 0.001 to about 10 weight percent of surfactant or dispersant, even more preferably from about 0.01 to about 5 weight percent surfactant or dispersant, still more preferably from about 0.1 to about 2 weight percent surfactant or dispersant, based on the total combined weight of solids. The concentration of surfactant or dispersant in the suspension is not critical. However, it has been found that a surfactant or dispersant concentration of about 10 weight percent can be advantageously used.

In alternate embodiments, the surfactant or dispersant can be provided in solid form. When provided in solid form, the relative quantity of surfactant or dispersant to platinum and particulate carbon is preferably the same as the preferred quantity for surfactant or dispersant provided in a suspension.

Sodium hydrogen sulfite, $NaHSO_3$, which converts platinum (IV) chloride to a platinum (II) hydrogen sulfite, can also be present in the suspension and can be provided in this manner for the conversion of the platinum to the +2 oxidation state. The concentration of $NaHSO_3$ can vary, and, expressed in terms of the mole ratio of $NaHSO_3$ to platinum, is preferably from about 3:1 to about 20:1, more preferably from about 5"1 to about 15:1, and even more preferably from about 7:1 to about 12:1.

After the ruthenium and platinum reagents have been combined to form a catalyst mixture and following addition of hydrogen peroxide, chemically treated particulate carbon, such as acidified particulate carbon, is added to the catalyst mixture. The carbon can be provided, for example, as a slurry or in solid form. Chemically treating the carbon can be accomplished by methods know to those skilled in the art. Acidification can be carried using various oxidizing acids. For example, carbon particles can be treated with an oxidizing agent such as oxygen gas, hydrogen peroxide, organic peroxides, ozone, or they can be oxidized and acidified with oxidizing acids such as, for example, nitric acid, perchloric acid, chloric acid, permanganic acid, or chromic acid. In some embodiments, a slurry of particulate carbon can be made with a dilute acid solution, and acidification can be effected by heating, for example, by refluxing the slurry. Optionally, in particular when the particles are treated with a functionalizing agent such as oxygen gas, ozone or a volatile organic peroxide, the particles can be heated, for example, to a temperature of about 175° C., preferably no higher than about 100° C. to avoid decomposition of the carbon.

The amount of particulate carbon used depends upon the desired composition of the catalyst being made. The concentration can be from about 0.01 weight percent metal including both platinum and ruthenium to about 99 weight percent metal, and from about 1 weight percent to about 99.99 weight percent carbon. In addition to platinum, the noble metal composition can one or more other metals selected from the group consisting of ruthenium, chromium, molybdenum, tungsten and iron. Ruthenium and platinum are preferred.

After the carbon has been added to the catalyst mixture, the catalyst mixture and carbon are contacted with a precipitating agent, which, it is believed, partially reduces the catalyst mixture and helps precipitate or deposit the catalyst particles on the carbon support. Hydrogen gas is a preferred precipitating agent. Optionally, the contacting with the reducing agent can be done in a controlled environment, such as, for example, in the presence of nitrogen. The use of an inert atmosphere such as a nitrogen atmosphere may be desirable when hydrogen gas is used as the precipitating agent.

Catalysts disclosed herein and made using the processes disclosed herein are useful in making fuel cells. Fuel cells are typically formed as stacks or assemblages of membrane electrode assemblies, and preferably include a coated substrate, an anode, cathode, and other optional components. The coated substrate can be, for example, a catalyst coated membrane (CCM) or a catalyst coated onto a gas diffusion backing to create a gas diffusion electrode (GDE). When used in making fuel cells, the catalysts disclosed herein are advantageously used to make a CCM or GDE.

The coated substrate comprises a substrate having coated thereon an electrocatalyst coating composition as described herein. The coated substrate can be a catalyst-coated membrane or a coated gas diffusion backing.

Electrocatalysts in the anode and the cathode typically induce the desired electrochemical reactions. The fuel cells typically also comprise a porous, electrically conductive sheet material that is in electrical contact with each of the electrodes, and permits diffusion of the reactants to the electrodes. As described herein, the electrocatalyst coating compositions can be coated on an ion exchange membrane, to form an anode or cathode thereon, thereby forming a catalyst coated membrane. Alternatively, the electrocatalyst coating composition can be coated on a porous, conductive sheet material, typically known as a gas diffusion backing. The gas diffusion backings are normally made of woven or non-woven carbon fiber substrates which are treated to affect the water wettability properties. The gas diffusion backing substrate can be coated on one or both surfaces with a thin porous layer containing carbon particles and a binder (usually PTFE). The thin porous layer is usually referred to as the "gas diffusion layer". The electrocatalyst coating composition can be coated on to the gas diffusion layer.

A variety of techniques are known for CCM manufacture. Typical manufacturing techniques involve the application of an electrocatalyst coating composition onto a substrate such as an ion exchange polymer membrane. Methods for applying the electrocatalyst onto the substrate include spraying, painting, patch coating and screen printing.

Typically, the electrocatalyst coating composition comprises an anode electrocatalyst, a binder such as an ion exchange polymer, and a solvent. Since the ion exchange polymer employed in the electrocatalyst coating composition serves not only as binder for the electrocatalyst particles but also assists in securing the electrode to the membrane, it is preferred that the ion exchange polymers in the composition be compatible with the ion exchange polymer in the membrane. Most typically, ion exchange polymers in the composition are the same type as the ion exchange polymer in the membrane.

Ion exchange polymers suitable for use in making coated substrates using the catalysts described herein include highly fluorinated ionexchange polymers. "Highly fluorinated" means that at least 90% of the total number of univalent atoms in the polymer are fluorine atoms. Most typically, the polymer is perfluorinated. It is typical for polymers used in fuel cells to have sulfonate ion exchange groups. The term "sulfonate ion exchange groups" as used herein means either sulfonic acid groups or salts of sulfonic acid groups, typically alkali metal or ammonium salts. For applications where the polymer is to be used for proton exchange such as in fuel cells, the sulfonic acid form of the polymer is typical. If the polymer in the electrocatalyst coating composition is not in sulfonic acid form when used, a post treatment acid exchange step can be used to convert the polymer to acid form prior to use.

Typically, the ion exchange polymer employed comprises a polymer backbone with recurring side chains attached to the backbone with the side chains carrying the ion exchange groups. Homopolymers or copolymes can be used. Copolymers are typically formed from one monomer that is a nonfunctional monomer and that provides carbon atoms for the polymer backbone, and a second monomer that provides carbon atoms for the polymer backbone and also contributes a side chain carrying a cation exchange group or its precursor, e.g., a sulfonyl halide group such a sulfonyl fluoride ($-SO_2F$), which can be subsequently hydrolyzed to a sulfonate ion exchange group. For example, copolymers of a first fluorinated vinyl monomer together with a second fluorinated vinyl monomer having a sulfonyl fluoride group ($-SO_2F$) can be used. Exemplary first fluorinated vinyl monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures of two or more thereof. Exemplary second monomers include fluorinated vinyl ethers with sulfonate ion exchange groups or precursor groups that can provide the desired side chain in the polymer. The first monomer can also have a side chain that does not interfere with the ion exchange function of the sulfonate ion exchange group. Additional monomers can also be incorporated into the polymers if desired.

Typical polymers for use in making coated substrates include polymers having a highly fluorinated, most typically a perfluorinated, carbon backbone with a side chain represented by the formula $-(O-CF_2CFR_f)_a-O-CF_2CFR'_fSO_3H$, wherein $R_f$ and $R'_f$ are independently selected from F, Cl and perfluorinated alkyl groups having 1 to 10 carbon atoms, wherein a=0, 1 or 2. Specific examples of suitable polymers include those disclosed in U.S. Pat. Nos. 3,282,875; 4,358,545; and 4,940,525. One exemplary polymer comprises a perfluorocarbon backbone and a side chain represented by the formula $-O-CF_2CF(CF_3)-O-CF_2CF_2SO_3H$. Such polymers are disclosed in U.S. Pat. No. 3,282,875 and can be made by copolymerization of tetrafluoroethylene (TFE) and the perfluorinated vinyl ether $CF_2=CF-O-CF_2CF(CF_3)-O-CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanging to convert to the acid, also known as the proton form. An exemplary polymer of the type disclosed in U.S. Pat. Nos. 4,358,545 and 4,940,525 has aside chain $-O-CF_2CF_2SO_3H$. The polymer can be made by copolymerization of tetrafluoroethylene (TFE) and the perfluorinated vinyl ether $CF_2=CF-O-CF_2CF_2SO_2F$, perfluoro(3-oxa-4-pentenesulfonyl fluoride) (POPF), followed by hydrolysis and acid exchange.

For perfluorinated polymers of the type described hereinabove, the ion exchange capacity of a polymer can be expressed in terms of ion exchange ratio ("IXR"). Ion exchange ratio is the number of carbon atoms in the polymer backbone in relation to the ion exchange groups. A wide range of IXR values for the polymer is possible. Typically, however, the IXR range for perfluorinated sulfonate polymers is from about 7 to about 33. For perfluorinated polymers of the type described hereinabove, the cation exchange capacity of a polymer can be expressed in terms of equivalent weight (EW). Equivalent weight (EW), as used herein, is the weight of the polymer in acid form required to neutralize one equivalent of NaOH. For a sulfonate polymer having a perfluorocarbon backbone and a side chain —O—$CF_2$—$CF(CF_3)$—O—$CF_2$—$CF_2$—$SO_3H$ (or a salt thereof), the equivalent weight range corresponding to an IXR of about 7 to about 33 is about 700 EW to about 2000 EW. A preferred range for IXR for such a polymer is from about 8 to about 23 (750 to 1500 EW), and a more preferred range is from about 9 to about 15 (800 to 1100 EW).

Any liquid medium compatible with the process for creating the GDE or CCM, or for coating the catalyst onto the substrate can be used. It is advantageous for the medium to have a sufficiently low boiling point that rapid drying of electrode layers is possible under the process conditions employed, provided however, that the composition does not dry so fast that the composition dries on the substrate before transfer to the membrane. When flammable constituents are to be employed, the medium can be selected to minimize process risks associated with such constituents, as the medium is in contact with the catalyst during use. The medium is also sufficiently stable in the presence of the ion exchange polymer that, in the acid form, has strong acidic activity. The liquid medium is typically polar for compatibility with the ion exchange polymer, and is preferably able to wet the membrane. While it is possible for water to be used as the liquid medium, the medium is preferably such that the ion exchange polymer coalesces upon drying and does not require post treatment steps such as heating to form a stable electrode layer.

A wide variety of polar organic liquids or mixtures thereof can serve as suitable liquid media for the electrocatalyst coating composition. Water in minor quantity can be present in the medium if it does not interfere with the coating process. Although some polar organic liquids can swell the membrane when present in sufficiently large quantity, the amount of liquid used in the electrocatalyst coating is preferably small enough that the adverse effects from swelling during the process are minor or undetectable. It is believed that solvents able to swell the ion exchange membrane can provide better contact and more secure application of the electrode to the membrane. A variety of alcohols are well suited for use as the liquid medium.

Typical liquid media include suitable $C_4$ to $C_8$ alkyl alcohols such as n-, iso-, sec- and tert-butyl alcohols; the isomeric 5-carbon alcohols such as 1,2- and 3-pentanol, 2-methyl-1-butanol, 3-methyl, 1-butanol, etc.; the isomeric 6-carbon alcohols, such as 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc.; the isomeric $C_7$ alcohols and the isomeric $C_8$ alcohols. Cyclic alcohols are also suitable. Preferred alcohols are n-butanol and n-hexanol, and n-hexanol is more preferred.

The amount of liquid medium in the anode electrocatalyst varies and is determined by the type of medium employed, the constituents of the electrocatalyst coating, the type of coating equipment employed, desired electrode thickness, process speeds etc.

It has been found that the commercially available dispersion of the acid form of the perfluorinated sulfonic acid polymer, sold by E.I. du Pont de Nemours and Company under the trademark Nafion®, in a water/alcohol dispersion, can be used as a starting material to prepare the electrocatalyst coating composition. Using this ion exchange polymer containing the dispersion of the acid form of the perfluorinated sulfonic acid polymer, as a binder and proton transport component for the electrocatalyst coating composition, the electrocatalyst can be added to form the electrocatalyst coating composition.

In the electrocatalyst coating composition, it is preferable to adjust the amounts of anode electrocatalyst, ion exchange polymer and other components, if present, so that the anode electrocatalyst is the major component by weight of the resulting electrode. More preferably, the weight ratio of anode electrocatalyst to ion exchange polymer in the electrode is about 2:1 to about 10:1.

Known electrocatalyst coating techniques can be used and will produce a wide variety of applied layers of essentially any thickness ranging from very thick, e.g., 20 μm or more to very thin, e.g., 1 μm or less.

The substrate for use in preparing a catalyst-coated membrane (CCM) can be a membrane of the same ion exchange polymers discussed above for use in the electrocatalyst coating compositions. The membranes can be made by known extrusion or casting techniques and have a thickness that can vary depending upon the intended application. The membranes typically have a thickness of 350 μm or less, although recently membranes that are quite thin, i.e., 50 μm or less, are being employed. While the polymer can be in alkali metal or ammonium salt form, it is typical for the polymer in the membrane to be in acid form to avoid post treatment acid exchange steps. Suitable perfluorinated sulfonic acid polymer membranes in acid form are available under the trademark Nafion® by E.I. du Pont de Nemours and Company.

Reinforced perfluorinated ion exchange polymer membranes can also be utilized in CCM manufacture. Reinforced membranes can be made by impregnating porous, expanded PTFE (ePTFE) with ion exchange polymer. ePTFE is available under the tradename "Goretex" from W. L. Gore and Associates, Inc., Elkton, Md., and under the tradename "Tetratex" from Tetratec, Feasterville, Pa. Impregnation of ePTFE with perfluorinated sulfonic acid polymer is disclosed in U.S. Pat. Nos. 5,547,551 and 6,110,333.

Alternately, the ion exchange membrane can be a porous support. A porous support may improve mechanical properties for some applications and/or decrease costs. The porous support can be made from a wide range of components, including hydrocarbons and polyolefins, e.g., polyethylene, polypropylene, polybutylene, copolymers including polyolefins, and the like. Perhalogenated polymers such as polychlorotrifluoroethylene can also be used. The membrane can also be made from a polybenzimadazole polymer, for example, by casting a solution of polybenzimadazole in phosphoric acid ($H_3PO_4$) doped with trifluoroacetic acid (TFA) as described in U.S. Pat. Nos. 5,525,436, 5,716,727, 6,025,085 and 6,099,988.

The gas diffusion backing comprises a porous, conductive sheet material such as paper or cloth, made from a woven or non-woven carbon fiber, that can be treated to exhibit hydrophilic or hydrophobic behavior, and a gas diffusion layer, typically comprising a film of carbon particles and fluoropolymers such as PTFE. The electrocatalyst coating composition is coated onto the gas diffusion backing. The electrocatalyst coating composition that forms the anode or cathode is the same as that described hereinabove for use in making the catalyst coated membrane.

An assembly including the membrane, and gas diffusion backings with the electrocatalyst composition coated either on the membrane or the gas diffusion backings or on both, is sometimes referred to as a membrane electrode assembly ("MEA"). Bipolar separator plates, made of a conductive material and providing flow fields for the reactants, are placed between a number of adjacent MEAs. A number of MEAs and bipolar plates are assembled in this manner to provide a fuel cell stack.

For the electrodes to function effectively in the fuel cells, effective anode and cathode electrocatalyst sites are provided. Effective anode and cathode electrocatalyst sites have several desirable characteristics: (1) the sites are accessible to the reactant, (2) the sites are electrically connected to the gas diffusion layer, and (3) the sites are ionically connected to the fuel cell electrolyte.

It is desirable to seal reactant fluid stream passages in a fuel cell stack to prevent leaks or inter-mixing of the fuel and oxidant fluid streams. Fuel cell stacks typically employ fluid tight resilient seals, such as elastomeric gaskets between the separator plates and membranes. Such seals typically circumscribe the manifolds and the electrochemically active area. Sealing can be achieved by applying a compressive force to the resilient gasket seals. Compression enhances both sealing and electrical contact between the surfaces of the separator plates and the MEAs, and sealing between adjacent fuel cell stack components. In conventional fuel cell stacks, the fuel cell stacks are typically compressed and maintained in their assembled state between a pair of end plates by one or more metal tie rods or tension members. The tie rods typically extend through holes formed in the stack end plates, and have associated nuts or other fastening means to secure them in the stack assembly. The tie rods may be external, that is, not extending through the fuel cell plates and MEAs, however, external tie rods can add significantly to the stack weight and volume. It is generally preferable to use one or more internal tie rods that extend between the stack end plates through openings in the fuel cell plates and MEAs as described in U.S. Pat. No. 5,484, 666. Typically, resilient members are utilized to cooperate with the tie rods and end plates to urge the two end plates towards each other to compress the fuel cell stack.

The resilient members accommodate changes in stack length caused by, for example, thermal or pressure induced expansion and contraction, and/or deformation. That is, the resilient member expands to maintain a compressive load on the fuel cell assemblies if the thickness of the fuel cell assemblies shrinks. The resilient member may also compress to accommodate increases in the thickness of the fuel cell assemblies. Preferably, the resilient member is selected to provide a substantially uniform compressive force to the fuel cell assemblies, within anticipated expansion and contraction limits for an operating fuel cell. The resilient member can comprise mechanical springs, or a hydraulic or pneumatic piston, or spring plates, or pressure pads, or other resilient compressive devices or mechanisms. For example, one or more spring plates can be layered in the stack. The resilient member cooperates with the tension member to urge the end plates toward each other, thereby applying a compressive load to the fuel cell assemblies and a tensile load to the tension member.

EXAMPLES

Comparative Example A 34.55 g of a 10.13 wt % (as Pt) chloroplatinic acid solution (prepared by combining $H_2PtCl_6$, 26.258-7, from Aldrich, St. Louis, Mo. with water to create a 10.13 wt % aqueous solution based on platinum) and 500 ml of water were added to a 10 liter container containing a magnetic stirring bar, which was placed onto a large magnetic stirring plate. 17.65 g of $NaHSO_3$ (3556,01 from J. T. Baker, Phillipsburg, N.J.) was added, and stirred for five minutes. The pH at this point was adjusted to approximately 5.0 using a dilute sodium carbonate solution. 858 ml of a 30-wt % solution of hydrogen peroxide (VWR, West Chester, Pa.) was added. The solution pH was controlled at 5 using the sodium bicarbonate solution. 89.77 g of a 2.02 wt % (as Ru) of ruthenium chloride solution (prepared by mixing $RuCl_3$ with water to prepare a 2.02 wt % solution as ruthenium) was diluted with 300 ml of water and slowly added to the solution over the course of 15 minutes. During the addition, pH was controlled to about 5.0 (using a 10% NaOH solution which was also added at a rate of 20 ml/minute). Temperature was controlled during the addition by the introduction of several ice cubes (prepared by distilled water) throughout the $RuCl_3$ addition. The temperature was not allowed to exceed approximately 50° C. during the $RuCl_3$ addition. 1.69 g of Vulcan® XC-72R carbon (Cabot Corporation, Boston, Mass.) was added, and stirred for 15 minutes, until the pH was stabilized.

The mixture was then placed in a container where nitrogen gas could be introduced through a glass frit that was submerged near the bottom of the reaction vessel (rate of 150 ml/min). 130 ml/minute of 100% $H_2$ gas was then introduced, and the mixture was "gas sparged" with hydrogen for approximately 5 hours while it was mechanically stirred.

Following the hydrogen sparging procedure, the reaction container was purged with $N_2$ gas for approximately 20 minutes (rate of 50 ml/min) and then filtered on a two-micron filter disk. It was subsequently washed with 5 liters of water. The filter cake was allowed to dry in air overnight before use.

In this comparative example, no surfactant or dispersant was used. In addition, the carbon support was not treated.

As shown in Table 1, it is clear that the total agglomerate volume obtained in this example is larger than desired.

Example 1

31.42 g of a 11.14 wt % (as Pt) chloroplatinic acid solution (prepared as described in Comparative Example 1) and 500 ml of water were added to a 10 liter container containing a magnetic stirring bar, which was placed onto a large magnetic stirring plate. 0.10 g of a 10-wt % aqueous suspension containing Daxad® 15LS dispersant (Hampshire Chemical Corporation, Houston Tex., a subsidiary of Dow Chemical) was added to the chloroplatinic acid solution. 17.65 g of sodium hydrogen sulfite, $NaHSO_3$ (J. T. Baker, 3556,01, Phillisburg, N.J.) was added, and stirred for five minutes.

The pH was adjusted to approximately 5.0 using a dilute sodium carbonate solution. 858 ml of a 30-wt % solution of hydrogen peroxide (VWR, West Chester, Pa.) was added. The solution pH was controlled at 5 using the sodium bicarbonate solution. 89.77 g of a 2.02 wt % (as Ru) of ruthenium chloride solution (prepared by mixing $RuCl_3$, 206229, St. Louis, Mo. with water to prepare a 2.02 wt % solution as ruthenium) was diluted with 300 ml of water and slowly added to the solution over the course of 15 minutes. During this addition, pH was controlled to about 5.0 (using a 10% NaOH solution which was also added at a rate of 20 ml/minute). Temperature was controlled during this addition by the introduction of several ice cubes (prepared by distilled water) throughout the $RuCl_3$ addition. The temperature was not allowed to exceed approximately 50° C. during the $RuCl_3$ addition.

Vulcan® XC72R powder was pretreated by the following procedure: 60.2 g of powder was slurry with 2% nitric acid (prepared by diluting 69% nitric acid with water, J. T. Baker). The material was refluxed for 5½ hours, filtered on a 2-micron filter, and then dried in a vacuum oven at 100° C. for five hours. 1.69 g of this material was added to the mixture with stirring over 15 minutes until the pH was stabilized.

The mixture was then placed in a container where nitrogen gas could be introduced through a glass frit that was submerged near the bottom of the reaction vessel (rate of 150 ml/min). 130 ml/minute of 100% $H_2$ gas was then introduced, and the mixture was "hydrogen sparged" in this way for approximately 5 hours while it was mechanically stirred.

Following the hydrogen sparging procedure, the reaction container was purged with $N_2$ gas for approximately 20 minutes (rate of 50 ml/min) and then filtered on a two-micron filter disk. It was subsequently washed with 5 liters of water. The resulting filter cake was allowed to dry in air overnight before use.

The same procedure as described above was used to produce a second catalyst. 34.55 g of 10.13-wt % (as Pt) chloroplatinic acid solution was used. 89.77 g of a 2.02 wt % (as Ru) of ruthenium chloride solution was added over a period of 15 minutes. 0.10 g of a 10-wt % aqueous suspension containing Daxad® 15LS dispersant (Hampshire Chemical Corporation, Houston, Tex., a subsidiary of Dow Chemical) was added to the chloroplatinic acid solution prior to the addition of the sodium hydrogen sulfite.

The Vulcan® XC72R powder was pretreated by the following procedure: 60.2 g of powder was slurry with 2% nitric acid (prepared by diluting 69% nitric acid with water, J. T. Baker). The material was refluxed for 5½ hours, filtered on a 2-micron filter, and then dried in a vacuum oven at 100° C. for five hours. 1.69 g of this material was used in the reaction.

The two catalysts were each analyzed by examining 28 individual transmission electron micrographs at 100,000× magnification. In all cases, 30% of the field of vision was occupied by catalyst particles. An average of the two independent measurements of the two preparations is tabulated in Table 1.

This example demonstrates that rapid $RuCl_3$ addition rates, coupled with a treated carbon support, and in the presence of a dispersant, contribute favorably for the formation of a non-agglomerated catalyst powder, as indicated by the 0.03 nm$^3$/nm$^2$ response in Table 1.

Comparative Example B

The procedure described in Example 1 was used, with the following differences. 34.55 g of a 10.13 wt % (as Pt) chloroplatinic acid solution (prepared by combining $H_2PtCl_6$, Aldrich, 26.258-7, St. Louis, Mo. with water to create a 10.13 wt % aqueous solution based on platinum) was used.

78.64 g of a 2.1 wt % (as Ru) of ruthenium chloride solution (prepared by mixing $RuCl_3$, 206229, St. Louis, Mo.) was used. The ruthenium chloride solution was added over a period of 60 minutes.

0.005 g of Tergitol® TM15-S-9 surfactant (Dow Chemical Company, Union Carbide, Danbury, Conn.) was added following the ruthenium chloride addition, prior to the addition of the carbon.

The Vulcan® XC72R powder was pretreated by the following procedure: 60.2 g of powder was slurry with 2% nitric acid (prepared by diluting 69% nitric acid with water, J. T. Baker). The material was refluxed for 5½ hours, filtered on a 2 micron filter, and then dried in a vacuum oven at 100° C. for five hours. 1.69 g of this material was used in the reaction.

A second catalyst sample was prepared. 34.55 g of a 10.13 wt % (as Pt) chloroplatinic acid solution (prepared by combining $H_2PtCl_6$, Aldrich, 26.258-7, St. Louis, Mo. with water to create a 10.13 wt % aqueous solution based on platinum) was used.

78.64 g of a 1.81 wt % (as Ru) of ruthenium chloride solution (prepared by mixing $RuCl_3$, 206229, St. Louis, Mo.) was used. The ruthenium chloride solution as added over a period of 60 minutes.

0.005 g of Tergitol® TM15-S-9 surfactant (Dow Chemical Company, Union Carbide, Danbury, Conn.) was added following the ruthenium chloride addition, prior to the addition of the carbon.

The Vulcan® XC72R powder was pretreated by the following procedure: 60.2 g of powder was slurry with 2% nitric acid (prepared by diluting 69% nitric acid with water, J. T. Baker). The material was refluxed for 5½ hours, filtered on a 2 micron filter, and then dried in a vacuum oven at 100° C. for five hours. 1.69 g of this material was used in the reaction.

The two catalysts were each analyzed by examining 28 individual transmission electron micrographs at 100,000× magnification. In all cases, 30% of the field of vision was occupied by catalyst particles. An average of the two independent measurements of the two preparations is tabulated in Table 1.

This Comparative Example shows that a slow rate of $RuCl_3$ addition (less than 0.3 millimoles Ru per minute), with a dispersant and a treated support, results in a catalyst displaying high metal particle agglomeration on the catalyst support, as indicated by the "response" of 3.84 nm$^3$/nm$^2$ in Table 1.

Comparative Example C

The procedure described in Example 1 was used, with the following differences. 34.55 g of a 10.13 wt % (as Pt) chloroplatinic acid solution (prepared by combining $H_2PtCl_6$, Aldrich, 26.258-7, St. Louis, Mo. with water to create a 10.13 wt % aqueous solution based on platinum) was used.

78.64 g of a 2.31 wt % (as Ru) of ruthenium chloride solution (prepared by mixing $RuCl_3$, 206229, St. Louis, Mo.) was used. The ruthenium chloride solution was added over a period of 60 minutes.

0.10 g of a 10-wt % aqueous suspension containing Daxad® 15LS dispersant (Hampshire Chemical Corporation, Houston Tex., a subsidiary of Dow Chemical) was added to the chloroplatinic acid solution prior to the addition of the sodium hydrogen sulfite.

The Vulcan® XC72R powder was pretreated by the following procedure: 60.2 g of powder was slurry with 2% nitric acid (prepared by diluting 69% nitric acid with water, J. T. Baker). The material was refluxed for 5½ hours, filtered on a 2 micron filter, and then dried in a vacuum oven at 100° C. for five hours. 1.69 g of this material was used in the reaction.

This Comparative Example shows that a slower rate of $RuCl_3$ addition (0.3 mmoles Ru/minute), with a surfactant and a treated support, results in a catalyst displaying high metal particle agglomeration on the support, as indicated by the response of 5.49 nm$^3$/nm$^2$ in Table 1.

Example 2

The procedure described in Example 1 was used, with the following differences. 34.55 g of a 10.13 wt % (as Pt) chloroplatinic acid solution was used.

78.64 g of a 1.81 wt % (as Ru) of ruthenium chloride solution was used. The ruthenium chloride solution was added over a period of 15 minutes.

0.005 g of Tergitol® TM15-S-9 surfactant (Dow Chemical Company, Union Carbide, Danbury, Conn.) was added following the ruthenium chloride addition, prior to the addition of the carbon.

The Vulcan® XC72R powder was pretreated by the following procedure: 60.2 g of powder was slurry with 2% nitric acid (prepared by diluting 69% nitric acid with water, J. T. Baker). The material was refluxed for 5½ hours, filtered on a 2 micron filter, and then dried in a vacuum oven at 100° C. for five hours. 1.69 g of this material was used in the reaction.

This example demonstrates that rapid $RuCl_3$ addition rates (0.94 mmoles Ru/min), coupled with a treated carbon support, and in the presence of a surfactant contribute favorably for the formation of a non-agglomerated catalyst powder, as indicated by the 0.0 $nm^3/nm^2$ response in Table 1.

Comparison of Examples 1 and 2 and Comparative Examples B and C shows that a $RuCl_3$ addition rate greater than 0.3 millimoles ruthenium per minute, combined with a treated support and a dispersant or surfactant, produces a catalyst having minimal agglomeration.

Example 3

In this example, example $H_2O_2$ and $RuCl_3$ are co-added; also the surfactant and carbon support are premixed before the addition of 84.34 g of a 12.45 wt % (as Pt) chloroplatinic acid solution and 1500 ml of water were added to a 10 liter container containing a magnetic stirring bar, which was placed onto a large magnetic stirring plate. 52.94 g of $NaHSO_3$ (J. T. Baker, 3556,01, Phillisburg, N.J.) was added, and stirred for five minutes. The pH was adjusted to approximately 5.0 using a dilute sodium carbonate solution. 400 ml of a 30-wt % solution of hydrogen peroxide (VWR, West Chester, Pa.) was added. The solution pH was controlled using the sodium bicarbonate solution. 214.17 g of a 2.54 wt % (as Ru) of ruthenium chloride solution was diluted with 300 ml of water and slowly added to the solution over 15 minutes. During the addition, pH was controlled to about 5.0 (using a 10% NaOH solution, which was also added at a rate of 20 ml/minute). Temperature was controlled by the introduction of several ice cubes, made from distilled water, throughout the $RuCl_3$ addition. The remainder of the $H_2O_2$ solution (2174 ml) was co-added, during the ruthenium chloride addition, over the same time period. The temperature was not allowed to exceed approximately 50° C. during the $RuCl_3$ addition.

5.07 g of Vulcan® XC-72R carbon (Cabot Corporation, Boston, Mass.) was acid treated by placing 61.21 g of Vulcan® XC72R powder (Cabot Co, Boston, Mass.) into 1 liter of 2 percent $HNO_3$. The carbon and acid were brought to reflux for 5½ hours, allowed to cool down, filtered through a 2 micrometer filter, and dried in a vacuum oven for 5 hours at 100° C. The treated carbon was mixed with 0.15 g of a 10-wt % solution containing Tergitol® TM15-S-9 surfactant (Dow Chemical Company, Union Carbide, Danbury, Conn.). The carbon and surfactant mixture was milled for two minutes prior to use.

The mixture of acid treated Vulcan® XC-72R carbon and Tergitol® surfactant was added to the reaction container containing the platinum and ruthenium reagents, and was stirred for 15 minutes, until the pH was stabilized. The combined mixture was then placed into a container into which nitrogen gas could be introduced through a glass frit that was submerged near the bottom of the container. 100% $H_2$ gas was then introduced at a rate of 130 ml/minute, and the mixture was hydrogen sparged for approximately 12 hours while it was mechanically stirred. Following the hydrogen sparging procedure, the reaction container was purged with $N_2$ gas for approximately 20 minutes (rate of 50 ml/min) and then the contents were filtered on a two micron filter disk. The resulting cake was subsequently washed with 5 liters of water and allowed to dry in air overnight before use.

Example 3 illustrates that, in a system in which treated carbon, a surfactant, and a rapid rate of $RuCl_3$ are used, a portion of hydrogen peroxide can be co-added with the ruthenium chloride solution. The advantage of this process variation is that it provides greater control over the reaction, particularly in view of foaming (associated with decomposition of hydrogen peroxide) that can occur.

Comparative Example D

The same procedure as described in Example 3 was used. 84.34 g of a 12.45 wt % Pt solution and 214.17 g of a 2.54 wt % Ru solution were used. No surfactant was added during any step.

The catalyst material, following sparging for 14 hours in $H_2$ gas, was filtered and washed with water. During the washing step, the filtrate was very dark in color. Final analysis of the product by both ICP (inductively coupled plasmas) analysis and XRF (X-ray fluorescence spectroscopy) analysis indicated incomplete deposition of the noble metal catalyst on the carbon support. The atomic Pt:Ru ratio of the powder measured by XRF was 0.74, and measured by ICP was 0.9.

This example utilized 75.9 wt % Pt/Ru treated Vulcan® Carbon, and no surfactant was added. The result was incomplete deposition of noble metal onto the catalyst support. It shows the importance of utilizing a surfactant or dispersant and a treated carbon to produce the supported noble metal catalyst.

Table 1

Results for Examples 1-3 and Comparative Examples A-D

The data presented in Table 1 is the total agglomerate volume per geometric area as obtained by summing the agglomerate volumes over 28 images (each at 100,000× magnification; the catalyst occupies ⅓ of the field of view) and then dividing by the total geometric area imaged over the 28 photographs.

To obtain the data, the agglomerate volume of noble metal particles, expressed in nm3, was divided by the total two-dimensional geometric area measured in the twenty-eight images. The data is presented as a "response", and is expressed in units of nm $3 \times 10^{11}$ per nm2 geometric area imaged on the catalyst surface. A spherical agglomerate geometry was assumed for the noble metal agglomerates on the carbon support.

TABLE 1

| | RuCl$_3$ addition Time | Addition Rate, mmoles Ru/min | Surfactant/Dispersant | Carbon Support Type | Response nm3 × 10^11 (nm3 agglomerate volume/nm2 geometric catalyst area) |
|---|---|---|---|---|---|
| 1 | 15.00 | 1.20 | Daxad ® | Treated | 0.03 |
| Comparative B | 60.00 | 0.25 | Tergitol ® | Treated | 3.84 |
| Comparative C | 60.00 | 1.20 | Daxad ® | Treated | 5.49 |
| Example 2 | 15.00 | 0.94 | Tergitol ® | Treated | 0.00 |
| Comparative A: base case for comparison, no surfactant or treated carbon | 15 | 1.2 | none | Untreated | 2.48 |
| Example 3; RuCl$_3$ and part of H$_2$O$_2$ co-added | 15 | 3.59 | Tergitol ® | Treated | 1.61 |
| Comparative D, RuCl$_3$ and part of H$_2$O$_2$ co added, but no surfactant is used; shows the importance of using a surfactant with a treated carbon support | 15 | 3.59 | None | Treated | No product |

Examples 1 and 2 and Comparative Examples B and C were analyzed as part of a larger data set of statistically designed experiments, in which three parameters (i) carbon support treatment vs. no treatment, (ii) dispersant (Daxad®) vs. surfactant (Tergitol®) addition, and (iii) RuCl$_3$ addition rate (over 15 versus 60 minutes) were explored. ECHIP software was used for the statistical analysis (ECHIP Incorporated, Hockessin, Del.). A description of concepts of statistically designed experiments is described in textbooks such as *Statistics for Experimenters, An Introduction to Design, Data Analysis and Model Building*, G. Box, W. Hunter, J. Hunter, John Wiley and Sons, 1978.

A statistical analysis of the above data showed that a more rapid ruthenium addition rate (performed over 15 minutes) and treatment of the carbon support are advantageous in the presence of either the surfactant or dispersant. In addition, in the presence of either the surfactant or dispersant, an unexpected, statistically verified (to greater than 95% confidence) two way interaction between the rate of addition of ruthenium and treatment of the carbon support was observed. This was a completely surprising and unusual reinforcing interaction between two important parameters to minimize the degree of agglomeration of the noble metal catalyst particles on the support.

What is claimed is:

1. A process for preparing a noble metal catalyst comprising providing a solution of a platinum reagent containing platinum having a valency less than (IV); adding an oxidizing agent; providing a solution of a ruthenium reagent containing ruthenium having a valency less than (IV) and adding said ruthenium reagent solution to said platinum reagent solution wherein at least a portion of said oxidizing agent is added to said platinum solution simultaneously with said addition of said ruthenium reagent solution, and subsequently providing treated particulate carbon; introducing said particulate carbon into said platinum reagent solution; and contacting said platinum and ruthenium reagent solution containing said particulate carbon with a precipitating agent.

2. A process for preparing a noble metal catalyst comprising providing a solution of a platinum reagent containing platinum having a valency less than (IV), said platinum reagent being formed by providing an aqueous chloroplatinic acid solution and adding to said aqueous chloroplatinic acid solution sodium hydrogen sulfite to form platinum sulfite acid and adding to said chloroplatinic acid solution a suspension containing from about 0.001 weight percent to about 2.0 weight percent of dispersant or surfactant, based on the total combined weight of solids; adding an oxidizing agent; providing treated particulate carbon; introducing said particulate carbon into said platinum reagent solution; and contacting said platinum reagent solution containing said particulate carbon with a precipitating agent.

3. A noble metal catalyst comprising a particulate carbon support and from about 5 to about 95 weight percent particulate metal, said metal comprising platinum, said catalyst having a total agglomerate volume less than about $2.4 \times 10^{11}$ nm$^3$/nm$^2$, wherein said carbon is treated.

4. The catalyst of claim 3 wherein said treatment comprises contacting said carbon with an agent selected from the group consisting of oxygen gas, hydrogen peroxide, organic peroxides and ozone.

5. The catalyst of claim 3 wherein said treatment comprises contacting said carbon with an agent selected from the group consisting of oxidizing acids.

6. The catalyst of claim 5 wherein said oxidizing acid is selected from the group consisting of nitric acid, perchloric acid, chloric acid, permanganic acid, and chromic acid.

7. A noble metal catalyst comprising a particulate carbon support and from about 5 to about 95 weight percent particulate metal, said metal comprising platinum, said catalyst having a total agglomerate volume less than about $2.4 \times 10^{11}$ nm$^3$/nm$^2$, and wherein said carbon support has an oxygen content from about 0.1 to about 5 weight percent, based on the weight of the carbon.

8. A noble metal catalyst comprising a particulate carbon support and from about 5 to about 95 weight percent particulate metal, said metal comprising platinum and ruthenium, said catalyst having a total agglomerate volume less than about $2.4 \times 10^{11}$ nm$^3$/nm$^2$, wherein the total amount of said platinum and said ruthenium is from about 60 to about 80 weight percent of the total weight of said platinum, said ruthenium, and said carbon support.

9. A catalyst prepared by providing a solution of a platinum reagent containing platinum having a valency less than (IV); adding an oxidizing agent; providing treated particulate carbon; introducing said particulate carbon into said platinum reagent solution; and contacting said platinum reagent solution containing said particulate carbon with a precipitating agent, said catalyst comprising a treated particulate carbon support and from about 5 to about 95 weight percent particulate metal, said metal comprising platinum, and having a total agglomerate volume less than about $2.4 \times 10^{11}$ $nm^3/nm^2$.

10. The catalyst of claim 9 wherein said treatment comprises contacting said carbon with an agent selected from the group consisting of oxygen gas, hydrogen peroxide, organic peroxides and ozone.

11. The catalyst of claim 9 wherein said treatment of the particulate carbon comprises contacting said carbon with an agent selected from the group consisting of oxidizing acids.

12. The catalyst of claim 11 wherein said oxidizing acid is selected from the group consisting of nitric acid, perchloric acid, chloric acid, permanganic acid, and chromic acid.

13. A catalyst prepared by providing a solution of a platinum reagent containing platinum having a valency less than (IV); adding an oxidizing agent; providing treated particulate carbon; introducing said particulate carbon into said platinum reagent solution; and contacting said platinum reagent solution containing said particulate carbon with a precipitating agent, said catalyst comprising a particulate carbon support and from about 5 to about 95 weight percent particulate metal, said metal comprising platinum, and having a total agglomerate volume less than about $2.4 \times 10^{11}$ $nm^3/nm^2$, and wherein said carbon support has an oxygen content from about 0.1 to about 5 weight percent, based on the weight of the carbon.

14. A catalyst prepared by providing a solution of a platinum reagent containing platinum having a valency less than (IV); adding an oxidizing agent; providing treated particulate carbon; introducing said particulate carbon into said platinum reagent solution; and contacting said platinum reagent solution containing said particulate carbon with a precipitating agent, said catalyst comprising a particulate carbon support and from about 5 to about 95 weight percent particulate metal, said metal comprising platinum and ruthenium, and having a total agglomerate volume less than about $2.4 \times 10^{11}$ $nm^3/nm^2$, wherein the total amount of said platinum and said ruthenium is from about 60 to about 80 weight percent of the total weight of said platinum, said ruthenium, and said carbon support.

15. A coated substrate comprising a substrate having coated thereon an electrocatalyst coating composition, wherein the electrocatalyst coating composition comprises an anode or cathode electrocatalyst comprising a particulate carbon support and particulate platinum having, said catalyst comprising from about 5 to about 95 weight percent platinum and having a total agglomerate volume less than about $2.4 \times 10^{11}$ $nm^3/nm^2$, wherein said carbon is treated.

16. The coated substrate of claim 15 wherein said treatment comprises contacting said carbon with an agent selected from the group consisting of oxygen gas, hydrogen peroxide, organic peroxides and ozone.

17. The coated substrate of claim 15 wherein said treatment comprises contacting said carbon with an agent selected from the group consisting of oxidizing acids.

18. The coated substrate of claim 15 wherein said oxidizing acid is selected from the group consisting of nitric acid, perchloric acid, chloric acid, permanganic acid, and chromic acid.

19. The coated substrate of claim 15 wherein said carbon support has an oxygen content from about 0.1 to about 5 weight percent, based on the weight of the carbon.

20. The coated substrate of claim 15 wherein the amount of said platinum is from about 50 to about 90 weight percent of the total weight of said platinum and said carbon support.

21. A fuel cell comprising a coated substrate, wherein the coated substrate comprises a substrate having coated thereon an electrocatalyst coating composition, and wherein the electrocatalyst coating composition comprises an anode or cathode electrocatalyst comprising a particulate carbon support and particulate platinum having, said catalyst comprising from about 5 to about 95 weight percent platinum and having a total agglomerate volume less than about $2.4 \times 10^{11}$ $nm^3/nm^2$, wherein said carbon is treated.

22. The fuel cell of claim 21 wherein said treatment comprises contacting said carbon with an agent selected from the group consisting of oxygen gas, hydrogen peroxide, organic peroxides and ozone.

23. The fuel cell of claim 21 wherein said treatment comprises contacting said carbon with an agent selected from the group consisting of oxidizing acids.

24. The fuel cell of claim 23 wherein said oxidizing acid is selected from the group consisting of nitric acid, perchloric acid, chloric acid, permanganic acid, and chromic acid.

25. A fuel cell comprising a coated substrate, wherein the coated substrate comprises a substrate having coated thereon an eleotrocatalyst coating composition, and wherein the electrocatalyst coating composition comprises an anode or cathode electrocatalyst comprising a particulate carbon support and particulate platinum having, said catalyst comprising from about 5 to about 95 weight percent platinum and having a total agglomerate volume less than about $2.4 \times 10^{11}$ $nm^3/nm^2$, wherein the substrate is an ion exchange membrane and said carbon support has an oxygen content from about 0.1 to about 5 weight percent, based on the weight of the carbon.

* * * * *